Nov. 20, 1962     C. P. BOUTTE     3,064,955
CONTACTING COLUMN
Filed March 17, 1960
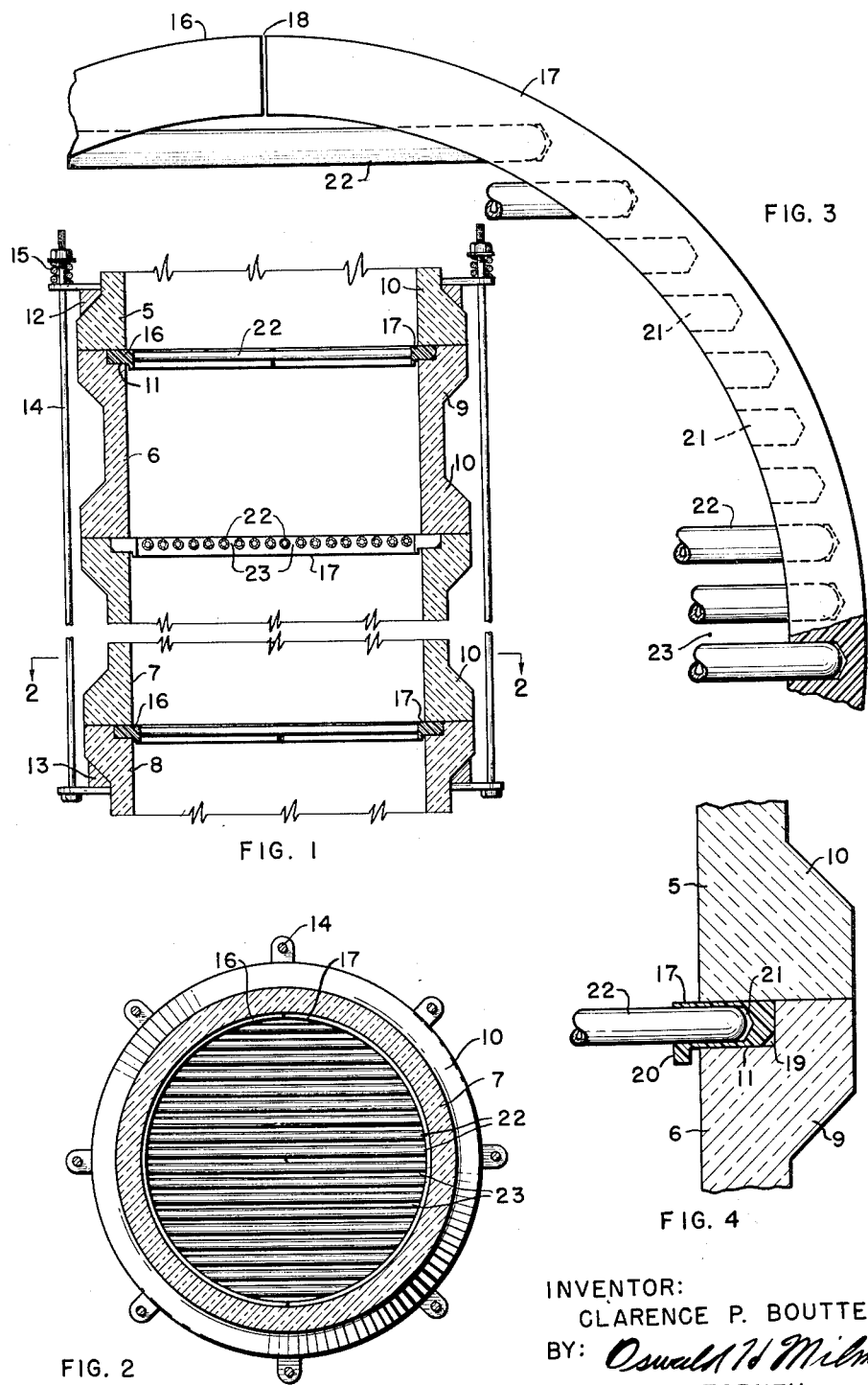
INVENTOR:
CLARENCE P. BOUTTE
BY: Oswald H. Milmore
HIS ATTORNEY

United States Patent Office 3,064,955
Patented Nov. 20, 1962

1

**3,064,955
CONTACTING COLUMN**
Clarence P. Boutte, Laplace, La., assignor to Shell Oil Company, New York, N.Y., a corporation of Delaware
Filed Mar. 17, 1960, Ser. No. 15,560
4 Claims. (Cl. 261—113)

The invention relates to contact columns having contact trays built up of grid bars that are spaced apart to provide openings, such as slots, for the passage of fluent materials to be contacted. Such contacting columns find particular application for fractionating columns wherein descending liquid and ascending gas (which term is used herein to include vapor) flow in countercurrent through the said openings, but may be applied also for other purposes, such as the scrubbing of air, smoke, and other gases with liquids, or in processes wherein the fluent material is a finely divided solid such as sand or a catalyst suspended in a gas, or for countercurrent liquid-liquid contacting.

In installations wherein the fluent material is corrosive or erosive it becomes impracticable to employ ordinary metal for the trays and their mounting, and the usual fixtures for mounting the trays within the column cannot be employed. One solution to this problem, described in the U.S. patent to Cogan, No. 2,711,308, involves supporting the tray on a ledge formed on a brick-lined column wall and securing the tray, composed of corrosion-resistant or erosion-resistant material, such as cast metal, ceramic or carbon, by a hold-down ring held in place by key bricks. However, the hold-down must, in practice, be constructed of corrosion-resistant metal unless an excessive number of key bricks are used, and the use of the latter, moreover, limits the solution to large-diameter columns able to contain a workman. Also, it is often desirable to avoid brick construction, so as to provide a smooth interior surface which is free from cracks or pockets wherein liquid may collect and wherein all construction materials exposed to the fluent material under treatment is free from contaminants. These requirements are important when certain sensitive or potentially hazardous materials, such as hydrogen peroxide, are involved.

A further drawback of earlier attempts to mount comparatively fragile or brittle bars, e.g., made of carbon or glass, between hard mounting surfaces, such as a porcelain ledge and a hold-down element, has been the tendency of the bars to vibrate and to rotate on their axes; the latter is especially pronounced when the bars are hollow, glass tubes circular in cross section. Movement of the bars eventually led to breaking off of their ends, and when enough rods were broken the remaining bars would become dislodged and fall from their position, causing breakage of itself and the trays beneath.

Still another difficulty encountered with prior tray mountings, especially when using mountings suitable for use in ceramic columns having smooth walls, has been gradual rotation of the tray about the vertical column axis. This leads to lack of orientation of successive trays which it is usually desired to maintain so that adjacent trays have their bars extending in a direction 90° from the bars of the adjacent trays.

It is an object of this invention to provide an improved mounting of the grid bars within a contacting column whereby the above-noted drawbacks are obviated.

In summary, according to the invention the upright column has an annular notch formed in the inside face of its wall, an annular support structure—such as a pair of half-rings positioned to form an annulus—having a plurality of horizontal holes or recesses is positioned at least in part into the said notch, and the grid bars are mounted with their ends in the said recesses. The support may be made of a rigid or a semi-rigid material, such as a resin; in the latter case it can yield slightly and is compressed in the notch to secure the bars against movement or vibration. The holes are spaced apart so position the bars with intervening slots. The support structure is secured by any suitable means—such as friction in the case of ceramic columns—so as to prevent the support structure and bars from moving rotationally about the column axis and thereby alter the orientation of the tray with respect to the others.

The invention will be further described with reference to the accompanying drawing which shows, by way of example, one preferred embodiment, wherein:

FIGURE 1 is a vertical sectional view through a part of a porcelain column fitted with trays according to the invention;

FIGURE 2 is a transverse sectional view taken on the line 2—2 of FIGURE 1;

FIGURE 3 is an enlarged, fragmentary plan view of the annular support structure, only some of the grid bars being shown; and FIGURE 4 is an enlarged detail view of a part of FIGURE 1.

Referring to the drawings in detail, the column comprises a plurality of ceramic, e.g., porcelain, column sections 5, 6, 7, 8, having smooth, cylindrical internal surfaces of the same diameter and flat, annular upper and lower end faces which may be ground to insure flatness. Adjoining end faces of adjacent sections are in abutment and in sealing relation and the joints between them may be made leak-proof by applying a liquid sealant to said end faces before assembly. Each section is widened externally adjacent its upper and lower ends, as shown at 9 and 10, and the upper end of each section has an annular groove or notch 11, rectangular in cross section, formed adjacent to the inner edge of the end face to provide an annular notch in the cylindrical surface of the column when the several sections are assembled as shown. The several sections are tied together by suitable clamp means, such as upper and lower metal rings 12, 13, which engage the frusto-conical surfaces of the widened portions 10 and 9, respectively, and are secured by tension rods 14 acting through springs 15.

Each notch 11 contains an annular support structure comprising a plurality, e.g., two ring sections 16 and 17 which leave a slight radial gap 18 and have the lower, outer corner chamfered as shown at 19. The sections 16 and 17 are preferably made of a resin which may be rigid or semi-rigid and at least slightly compressible; an example is as polytetrafluoroethylene, sold under the trade name Teflon. To add strength to these ring sections and to prevent drainage of liquid along the wall, each is preferably provided with a downwardly extending flange 20, which is spaced from the column wall. Each ring section contains a plurality of horizontal recesses 21 which are cylindrical throughout most of their lengths along parallel axes and are open to the radially inner face of the ring section. These recesses are positioned so that a pair of corresponding recesses on opposite sides of the annular structure are aligned and each such pair carries a separate grid bar 22, such as a glass tube having closed, rounded ends as shown. The recesses are positioned to space the bars horizontally and thereby provide a plurality of slots 23 of equal widths. The recesses are shaped to receive the ends of the bars with snug fits and are circular in cross section in the embodiment shown. The vertical dimension of the ring sections is equal to that of the notch 11 when made of rigid material. When these rings are made of semi-rigid material it is possible to take advantage of the compressibility of the ring to insure a slight pressure on the bars after assembly; in this case the ring sections exceed slightly the vertical dimension of the notch 11.

When assembling the column, the ends of the grid bars 22 are first inserted into the recesses of the two ring sections and the assembly is placed into the open notch 11 of a column section. The next higher column section is then placed on the said section, to engage both the end face of the lower section and the upper surface of the annular structure. If desired, a coating of a sealant may be applied to the end face before assembly. The successive trays are preferably oriented so that the bar direction of each is 90° from the bar directions of the adjacent higher and lower trays, as shown in FIGURE 1. When the several sections and the intervening trays have been assembled the sections are clamped together by means of the rods 14, thereby placing the annular structures into slight vertical compression to secure them.

The tray, as applied to distillation operates by the upward passage of gas or vapor countercurrently to liquid, both of which flow through the slots 23. Details of grid tray operation are now known and need not, therefore, be described; see for example the above-cited patent to Cogan.

In operation the tray according to the invention has improved tray efficiency by maintaining the proper tray orientation with respect to adjacent trays and by maintaining the proper liquid level on each tray, in that the uniform intervals between the bars are maintained and bars are not lost by breakage. Further, the flange 20 prevents drainage of liquid along the column wall and thereby reduces the tendency of some liquid to descend between trays without passage in countercurrent with the gas.

I claim as my invention:

1. A contacting column which comprises a plurality of at least three tubular column sections stacked to form an upright tank having a tubular surface and an internal annular notch at each joint between sections, said sections being widened outwardly at said joints to house the notches, an annular support structure for each said notch positioned at least partly therein, each said structure comprising a plurality of integral sectors of a ring made of a resin and in clamping relation with the respectively higher and lower column section, each said annular structure having a plurality of horizontal recesses extending thereinto from the radially inner face of the structure along parallel axes, said integral sectors providing walls completely bounding said recesses peripherally about the axes thereof, said recesses being positioned in axially aligned pairs, a single grid bar for each pair of aligned recesses having the ends thereof positioned snugly within said recesses, said bars being spaced apart from one another to provide intervening openings for the passage of substances to be contacted, and means clamping said column sections together.

2. A contacting column which comprises a plurality of tubular sections stacked to form an upright tank having a tubular internal surface and an internal annular notch formed at the joint between said sections, an annular support structure comprising a plurality of integral sectors of a ring positioned within said notch and held in clamping relation with the upper and lower column sections, said annular structure having a plurality of horizontal recesses extending thereinto from the radially inner face of the structure along parallel axes, said integral sectors providing walls completely bounding said recesses peripherally about the axes thereof, said recesses being positioned in axially aligned pairs, a single grid bar for each said pair of aligned recesses having the ends thereof positioned snugly within said recesses, said bars being spaced apart from one another to provide openings for the passage of the substance to be contacted, and means for clamping said column sections together.

3. Column according to claim 2 wherein said support structure is made of a resin and said bars are made of ceramic.

4. Column according to claim 3 wherein said support structure is made of polytetrafluoroethylene resin.

References Cited in the file of this patent

UNITED STATES PATENTS

| 1,028,157 | Trinks | June 14, 1912 |
| 1,366,958 | Schneible | Feb. 1, 1921 |
| 1,878,467 | Clarke | Sept. 20, 1932 |
| 1,937,486 | Demers | Nov. 28, 1933 |
| 2,711,308 | Cogan | June 21, 1955 |
| 2,896,928 | Osborne | July 28, 1959 |

FOREIGN PATENTS

| 326,117 | France | Feb. 12, 1903 |